United States Patent [19]

Henderson

[11] Patent Number: 4,923,204

[45] Date of Patent: May 8, 1990

[54] ADJUSTABLE KING PIN ASSEMBLY

[76] Inventor: Richard Henderson, 9403-82nd Street, Fort St. John B.C., Canada

[21] Appl. No.: 258,707

[22] Filed: Oct. 17, 1988

[51] Int. Cl.$^5$ ............................................... B62D 53/08
[52] U.S. Cl. ................................ 280/407.1; 280/407; 280/438.1
[58] Field of Search ..................... 280/438.1, 433, 407, 280/407.1

[56] References Cited

U.S. PATENT DOCUMENTS

| 2,714,016 | 7/1955 | Smith | 280/433 |
| 3,834,736 | 9/1974 | Dodgson | 280/407 |
| 3,893,710 | 7/1975 | Madura | 280/407 |

FOREIGN PATENT DOCUMENTS

| 355915 | 2/1936 | Canada . |
| 624175 | 7/1961 | Canada . |
| 707653 | 4/1965 | Canada . |

Primary Examiner—David M. Mitchell
Assistant Examiner—Donn McGiehan
Attorney, Agent, or Firm—Sixbey, Friedman, Leedom & Ferguson

[57] ABSTRACT

An adjustable king pin assembly for releasably mating with a fifth wheel assembly on a tractor-trailer arrangement. The king pin is secured to a plate which plate is slidably positioned for longitudinal movement with respect to the frame of the trailer in a space between spaced, elongated, longitudinally aligned guide bars. Spaced longitudinally aligned apertures are provided in the plate or guide bars, and an appropriate locking mechanism, secured to the assembly, is releasably movable into locking position in any one of each one of the apertures to securely hold the plate in position against longitudinal movement. An appropriate mechanical control mechanism is provided for moving the locking means from and into locking position. The assembly according to the invention provides an economical and easy-to-operate system for longitudinally positioning the king pin.

20 Claims, 2 Drawing Sheets

ADJUSTABLE KING PIN ASSEMBLY

BACKGROUND OF THE INVENTION

The present invention relates to a king pin assembly, and more particularly relates to an adjustable assembly for the king pin which releasably mates with a fifth wheel assembly on a tractor-trailer arrangement.

Most large lumber and commercial trucks consist of tractor units and various forms of trailers attached to the tractors. The tractor consists of an engine, cab for the driver, transmission and drive wheels, and a "fifth wheel" which is a horizontal, flat circle of metal with a pie-shaped wedge cut out of its rear-most portion. A downward pointing pin at the front of a trailer slips into the fifth wheel through the pie-shaped opening, and slips down into a retaining hole centred within the fifth wheel. The fifth wheel then bears the pulling load of the tractor and, as the trailer pin is cylindrical in shape, it allows the tractor to hinge at the pin-fifth wheel connection for turns.

Conventionally fifth wheels may be longitudinally adjustable on the tractor unit by means of, for example, an air pressured power pin mounted on the fifth wheel that fits into various slots on the deck of the tractor, allowing the fifth wheel to be moved forwards and backwards. An example of such a construction is shown in Canadian Pat. No. 624,175 of Buvelot issued July 18, 1961.

Several advantages arise if the king pin can be provided with a measure of longitudinal adjustment. For example, this would allow the driver of the vehicle to change the weights on the driving axles of the tractor and the forward-most set of wheels on the trailer, such that he might increase traction on the drive wheels when necessary. As well, relative adjustment of the location of the king pin in the longitudinal direction would permit the driver to adjust the load on the trailer so that all of the axles on the tractor and trailer are of legal weight, rather than one being over legal weight and requiring either special permits or the payment of fines if no permit is available or if the weight is in excess of the permit.

Canadian Pat. No. 355,915 of Gurton issued Feb. 11, 1936 describes and illustrates a relatively simple form of longitudinally adjustable king pin arrangement, in which the king pin is attached to a longitudinally movable thrust bar, which is spring biased to return to starting position after, for example, the tractor and trailer have completed a turn.

Canadian Pat. No. 707,653 of Gravelle issued April 13, 1965 describes and illustrates a king pin mounting which is longitudinally adjustable, in which the king pin depends from a plate which is slidably, longitudinally adjustable. The plate is provided with upwardly directed locking pins which are receivable within several orifices longitudinally aligned in a removable keeper plate overlying this king pin plate. Adjustment of the positioning of the king pin must be done manually with this construction.

It is an object of the present invention to provide an alternative construction of longitudinally adjustable king pin assembly for cooperating with fifth wheel mechanisms. It is a further object of the present invention to provide such a a king pin assembly which does not require manual adjustment, and which is automatically, mechanically adjustable.

SUMMARY OF THE INVENTION

In accordance with the present invention there is provided a king pin assembly for a trailer comprising a frame, to releasably mate with a fifth wheel assembly on a tractor. The assembly comprises a king pin secured to a plate which is slidably positioned for longitudinal movement with respect to the frame of the trailer in a space between spaced, elongated, longitudinally aligned guide bars secured to the frame. The guide bars guide the plate longitudinally in a sliding movement. Spaced, longitudinally aligned apertures are provided in the plate. Locking means are secured to the frame adjacent the plate and are releasably movable into locking position in any one of each one of the apertures. When an aperture is aligned with the locking means, and the locking means is in locking position in the aperture, the plate is securely held in position against longitudinal movement. Mechanical means are provided for moving the locking means from locking position in the aperture and moving it into locking position in an aligned aperture, as required.

In a preferred embodiment of the present invention, the locking means comprises a movable locking pin mechanically actuable between locking position with a portion thereof seated in an aligned aperture and released position with the pin being clear of said aperture. As well, the movement of the locking pin between locking and released positions is controlled by pneumatic actuation means mechanically associated with the locking pin.

In an alternative embodiment of the present invention, the apertures are notches spaced along a side of the guide bar adjacent the plate, a movable locking pin being mechanically actuable between locking position with a portion thereof obstructing the plate against longitudinal movement and released position with the plate not obstructed thereby and free for longitudinal movement.

The assembly in accordance with the present invention allows the driver of the tractor-trailer vehicle to change the weights on the driving axles of the tractor and the forward-most set of wheels on the trailer so that traction on the drive wheels is increased as necessary, by moving the king pin longitudinally forwardly with respect to the tractor and trailer. Alternatively, by appropriately adjusting the longitudinal positioning of the king pin, the load carried on the trailer may be appropriately adjusted over the axles on the trailer, for example so that all of the axles bear a legal weight load. Operation of the assembly in accordance with the present invention may be controlled mechanically from the tractor's cab, thereby significantly facilitating that operation.

BRIEF DESCRIPTION OF THE DRAWINGS

These and other objects and advantages of the invention will become apparent upon reading the following detailed description and upon referring to the drawings in which.

Figure 1:
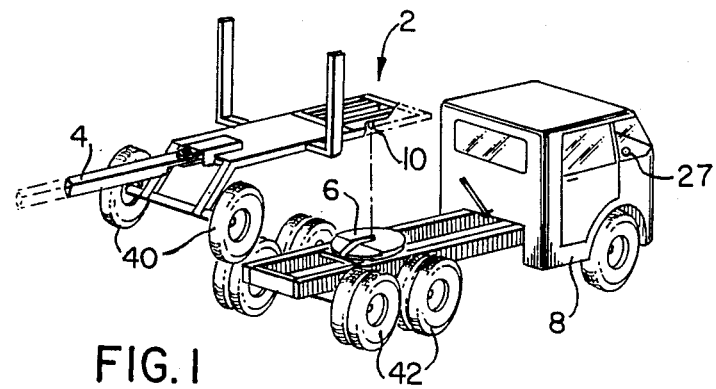
FIG. 1 is a perspective view of a tractor-trailer arrangement having an adjustable king pin in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1, there is illustrated an adjustable king pin assembly 2 in accordance with the present invention, mounted at the front of a trailer 4, for releasably mating with a fifth wheel assembly 6 secured to the rear platform of a tractor 8. King pin assembly 2 illustrated in more detail in FIG. 2, comprises a king pin 10 secured towards one end of and downwardly depending from a flat, rectangular plate 12. Plate 12 is slidably supported on top of an upper fifth wheel plate 16 which is bolted or otherwise secured to the bottom of the forward part of the frame of trailer 4. The upper fifth wheel plate normally rests on the top of the fifth wheel when king pin 10 is matably seated in the fifth wheel assembly 6. An aperture 18 is provided in upper fifth wheel plate 16, elongated in the longitudinal direction with respect to the trailer, through which king pin 10 projects and within which it may slide. Guide bars 20, secured to the upper surface of upper fifth wheel plate 16, in spaced, longitudinally aligned fashion, are positioned closely adjacent opposite sides of plate 12 to guide that plate longitudinally in its sliding movement.

Figure 2:
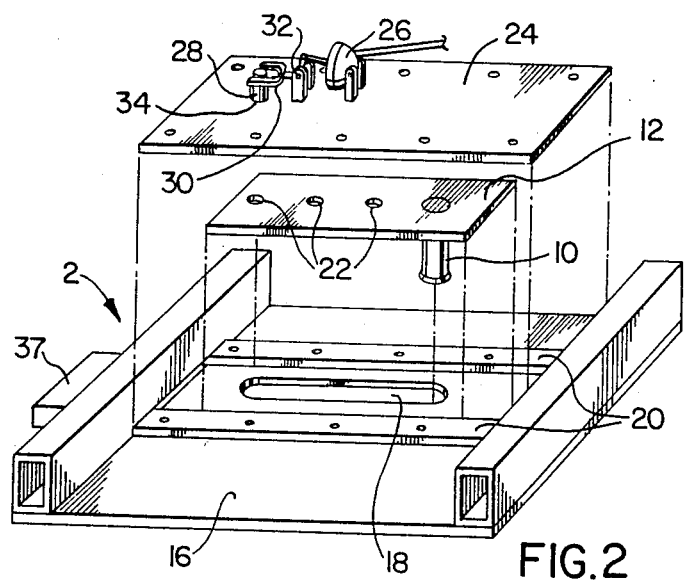
FIG. 2 is a detailed, perspective view of the adjustable king pin assembly of FIG. 1.
Figure 3:
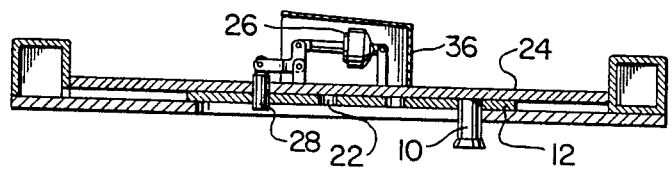
FIG. 3 is a section view of the assembly through line III—III of FIG. 2.

In the embodiment of FIGS. 1 to 3, a plurality of circular apertures 22 are spaced longitudinally along the center of plate 16 as illustrated.

A cover plate 24 is bolted to guide bars 20. On cover plate 24 is secured a pneumatic cylinder 26, which cylinder controls a retaining pin 28 by means of yoke 30 and hinge 32, so that the pin may be moved through a slot 34 in cover plate 24 into position protruding into an aligned aperture 22 of plate 12 below it, or removed therefrom, as required. The operating of pneumatic cylinder 26 is preferably controlled from the cab of tractor 8 by an appropriate pneumatic cylinder control unit 27. An appropriate metal shield 36 fits over pneumatic cylinder 26 above cover plate 24 to protect it.

A sleeve 37 is secured to upper fifth wheel plate 16, adjacent one end thereof, to receive the corresponding end of plate 12 when pin 28 is seated in aperture 22 at the opposite end of plate 12, and to completely enclose the space within which plate 12 moves. Sleeve 37 protects slide plate 12 from damage.

With the assembly illustrated in FIGS. 1 to 3, the fifth wheel pin 10 would normally be in the forward-most position, which is the standard location for the usual non-adjustable king pin units. In the illustrated embodiment, the apertures 22 may for example be 7 inches apart, making it possible for king pin 10 to be positioned 14 inches further to the rear than its usual position. This would cause the nose of trailer 4 to be 14 inches further forward than usual position in relation to the fifth wheel assembly 6 on tractor 8.

While a 14 inch adjustment may seem trivial, the maximum allowable weight for example for a log trailer on most roads may be 110,000 pounds, all of which weight rests on the wheels 40 of trailer 4 and tandem drive wheels 42 at the rear of tractor 8. The tandem drive wheels 42 are generally limited to a weight of 17,500 kilograms. When a truck is weighed on highway scales, it is possible for some of its axles to be of legal weight and some of its axles to be of non-legal weight. If any of the axles are of non-legal weight then unless the truck has a special overweight permit, it is subject to being fined immediately for the load being overweight. The movement of king pin 10 by 7 inches, causing such a loaded log trailer to move forward 7 inches further over the tandem drive wheels 42, causes a weight gain of 1,300 kilograms on the tandem drive wheels. Movement of the pin another 7 inches forward, for a total adjustment of 14 inches, has been shown to increase the weight on the drive wheels by 3,470 kilograms, or almost 20% of the legal load. As the trailer 4 is adjusted so that more load is carried on tandem drive wheels 42 of tractor 8, the load on the trailer wheels 40 is lessened commensurately. By being able to adjust the load back and forth between the tractor drive wheels 42 and trailer wheels 40, an illegal load can be made legal for scale purposes. Additionally, as previously indicated, when necessary additional weight can in this way be put on the tandem drive wheels 42 so as to give extra traction in slippery conditions.

Figure 4:
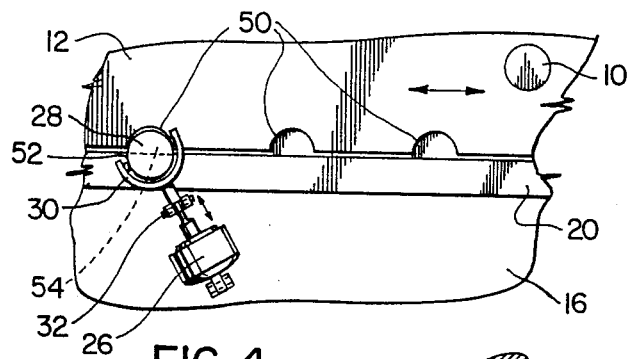
FIGS. 4 and 5 are respectively plan and side section schematic partial views of an alternative embodiment of the assembly in accordance with the present invention.
Figure 5:
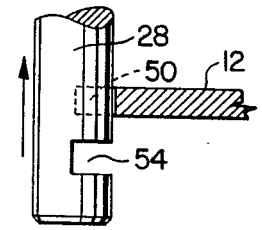

Turning to FIGS. 4 and 5, there is illustrated yet a further embodiment of the present invention, in which instead of apertures 22 in plate 12 being circular holes centred in the plate, they are notches 50 in the side of the plate. As well, retainer pin 28, activated by pneumatic cylinder 26, is positioned to the corresponding side of slide plate 12 so that, when in locked position, pin 28 is seated in notch 50 (and corresponding notch 52 in the adjacent guide bar 20) so as to obstruct sliding movement of that plate. A portion of pin 28 is provided with a notch 54, notch 54 being of a size and positioned to receive a portion of the side edge of slide plate 12. When pin 28 is in released position, notch 54 is aligned with that edge of plate 12 so that plate 12 is free to slide longitudinally. When notch 54 is positioned out of alignment with that edge of the plate with pin 28 in locked position, longitudinal movement of the plate will be obstructed by that side edge of the plate hitting pin 28.

Figure 6:
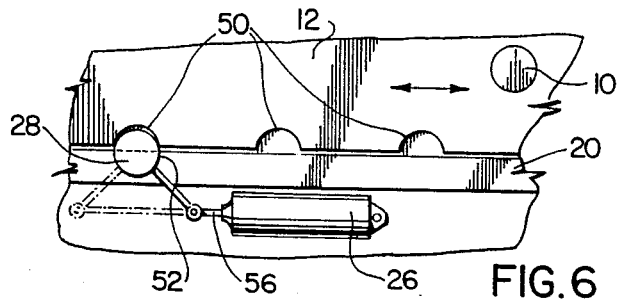
FIGS. 6 and 7 are schematic plan partial views of yet further alternative embodiments thereof.

A further alternative embodiment of assembly 2 in accordance with the present invention is illustrated in FIG. 6. Pin 28 is rotated between locked and unlocked position by means of rod 56 from pneumatic cylinder 26. The notched configuration of plate 12 and the adjacent guide bar 20 is similar to that of FIG. 4. In this case however, all or a portion of pin 28 has a transverse cross-section in the form of a semi-circle so that, the pin is in one orientation, with the semi-circle portion of the pin completely in notch 52, slide plate 12 is free to slide longitudinally. When rotated so that this portion of its body protrudes into notch 50, pin 28 then being in locked position, slide plate 12 is held in that position and prevented from relative longitudinal movement.

Figure 7:
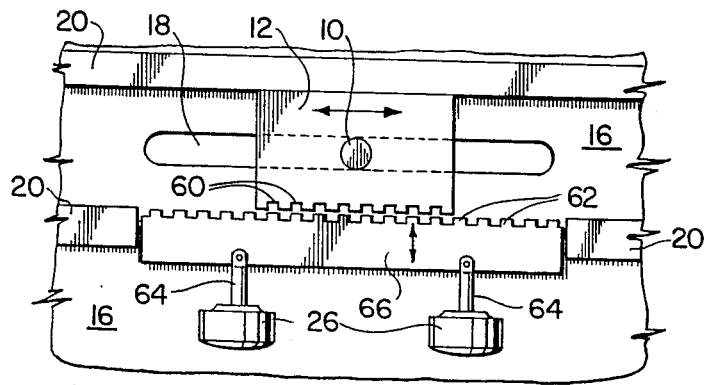

A further embodiment of assembly 2 in accordance with the present invention is illustrated in FIG. 7. In this embodiment, a plurality of regular notches 60 are provided in one side of plate 12, and a corresponding bar with projections 60 is provided along that side, the bar being movable, by bars 64 extending from pneumatic cylinders 26, into ratcheting position in corresponding, aligned notches 60 so as to hold plate 12 firmly in position at that location. The action of pneumatic cylinders 26 is such as to either move bar 66, on which protrusions 22 are positioned, into securing, mated position in notches 62, or to move bar 66 away from plate 12 so that protrusions 62 are clear of notches 60 and plate 12 is then free to slide between guide bars 20 with king pin 10 in groove 18.

Thus it is apparent that there has been provided in accordance with the present invention an adjustable king pin assembly that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a king pin assembly for a trailer having a longitudinal axis comprising a frame, to releasably mate with a fifth wheel assembly on a tractor, the improvement characterized in that the king pin assembly comprises housing means secured to said frame including spaced, elongated, longitudinally aligned guide bars extending substantially parallel to the longitudinal axis of said trailer, a king pin secured to a plate slidably positioned for longitudinal movement with respect of the frame of the trailer in a space enclosed by said housing means between said spaced, elongated, longitudinally aligned guide bars the guide bars to guide the plate longitudinally in such sliding movement; spaced, longitudinally aligned apertures being provided in the plate; locking means mounted adjacent the plate and releasably movable into locking position within said housing means in any one of each one of the apertures when said aperture is aligned with the locking means, to securely hold the plate in position against longitudinal movement when in locking position in said aperture; and mechanical means for moving the locking means from locking position in said aperture and moving it into locking position in an aligned aperture, as required.

2. An assembly according to claim 1 wherein said locking means comprises a movable locking pin mechanically actuable between locking position with a portion thereof seated in an aligned aperture and released position with the pin being clear of said aperture.

3. An assembly according to claim 2 wherein the movement of the locking pin between locking and released positions is controlled by pneumatic actuation means mechanically associated with the locking pin.

4. An assembly according to claim 1 wherein said plate is supported on a fifth wheel plate secured to the trailer frame, the fifth wheel plate having a longitudinally extending, elongated slot through which the king pin protrudes.

5. An assembly according to claim 1 wherein the apertures are notches spaced along a side of the plate adjacent one of the guide bars.

6. An assembly according to claim 5 wherein the locking means comprises a movable locking pin.

7. An assembly according to claim 6 wherein the movement of the locking pin between locking and released positions is controlled by pneumatic actuation means mechanically associated with the locking pin.

8. An assembly according to claim 5 wherein the locking means comprises a movable locking pin mechanically actuable between locking position with a portion thereof obstructing the plate against longitudinal movement, and released position with the plate not obstructed thereby and free for longitudinal movement.

9. An assembly according to claim 8 wherein the movement of the locking pin between locking and released positions is controlled by pneumatic actuation means mechanically associated with the locking pin.

10. An assembly according to claim 1 wherein means are provided in the tractor for operating the mechanical means.

11. In a king pin assembly comprising a frame to releasably mate with a fifth wheel assembly, the improvement characterized in t hat the king pin is secured to a plate slidably positioned for longitudinal movement with respect to the frame of the trailer in a space between spaced, elongated, longitudinally aligned guide bars secured to the frame, the guide bars to guide the plate longitudinally in such sliding movement; spaced, longitudinally aligned apertures being provided in a side of the plate; locking means being secured to the frame adjacent the guide bars and releasably movable in locking position in any one of each of the apertures when said aperture is aligned with the locking means, to securely hold the plate in position against longitudinal movement when in locking position in said aperture; drive means for automatically moving the locking means either from a locking position in said aperture or moving said locking means into locking position in an aligned aperture, as required; and control means operative to initiate the automatic operation of said drive means.

12. An assembly according to claim 10 wherein said apertures are notches spaced along a side of the plate adjacent one of the guide bars, and said locking means comprises a laterally movable bar having extensions located so that the extensions may be moved into locking engagement with apertures of the plate when the bar is moved towards the plate into locking position.

13. An assembly according to claim 11 wherein the locking means comprises a movable locking pin mechanically actuable between locking position with a portion thereof obstructing the plate against longitudinal movement, and released position with the plate not obstructed thereby and free for longitudinal movement.

14. An assembly according to claim 13 wherein the movement of the locking pin between locking and released positions is controlled by pneumatic actuation means mechanically associated with the locking pin.

15. In a king pin assembly for a trailer comprising a frame, to releasably mate with a fifth wheel assembly on a tractor, the improvement characterized in that the king pin is secured to a plate slidably positioned for longitudinal movement with respect to the frame of the trailer in a space between spaced, elongated, longitudinally aligned guide bars secured to the frame, the guide bars to guide the plate longitudinally in such sliding movement; spaced, longitudinally aligned apertures being provided in the plate; said apertures being formed by notches spaced along a side of the plate adjacent one of the guide bars; locking means secured to the frame adjacent the plate and releasably movable into locking position in any one of each one of the apertures when said aperture is aligned with the locking means, to securely hold the plate in position against longitudinal movement when in locking position in said aperture, the locking means comprising a movable locking pin mechanically actuable between a locking position with a portion thereof obstructing the plate against longitudinal movement, and a released position with the plate not obstructed thereby and free for longitudinal movement, the locking pin being provided with a plate-receiving notch, the pin being movable within said aperture between the locking position with the plate-receiving notch not aligned with the plate, so longitudinal movement of the plate will be obstructed by the pin, and the released position with the plane of the plate aligned with said plate-receiving notch for passage of a portion of the plate therethrough during longitudinal movement of the plate; mechanical means for moving the locking means from the locking position in said apertures or moving it into locking position in aligned apertures, as required.

16. A king pin assembly for a trailer having a longitudinal axis comprising an upper fifth wheel plate secured to the frame, an elongate aperture formed in said fifth wheel plate and extending along or parallel to the longitudinal axis of said trailer, spaced, elongated, longitudinally aligned guide bars secured to said upper fifth wheel plate on opposite sides of said elongate aperture, said guide bars extending substantially parallel to the longitudinal axis of said trailer, a flat king pin support plate with a king pin projecting therefrom, said king pin support plate being positioned for sliding movement on said upper fifth wheel plate between said guide bars with said king pin projecting through said elongate aperture, a cover plate secured to said guide bars over said king pin support plate to retain said king pin support plate in position between said guide bars, said cover plate being larger than said king pin support plate to completely cover said king pin support plate, longitudinally aligned apertures formed in said king pin support plate, locking means mounted adjacent to the king pin support plate and movable into a locking position in one or more of said apertures when at least one of said apertures is aligned with said locking means to securely hold said king pin support plate in position against longitudinal movement, said locking means including locking pin means to engage said apertures under said cover plate, and control means for moving the locking means between an unlocking position and said locking position, said locking means being disengaged from said apertures in the unlocking position to permit movement of said king pin support plate between said guide bars.

17. The king pin assembly according to claim 16, wherein said locking pin control means includes a locking pin actuation means connected to said locking pin means, said locking pin actuation means being mounted on said cover plate, said locking pin means extending downwardly from said cover plate to engage the apertures in said king pin support plate.

18. The king pin assembly according to claim 16 wherein said apertures are centered in said king pin support plate, said locking means being mounted on said cover plate.

19. The king pin assembly of claim 16, wherein said control means includes pneumatic actuation means connected to move said locking pin means into and away from engagement with said apertures and means in said tractor to control said pneumatic actuation means.

20. An assembly according to claim 1, wherein remote control means are connected to said mechanical means to control the operation of said mechanical means, said mechanical means operating automatically in response to said remote control means to move said locking means either into or from the locking position.

* * * * *